April 13, 1954  T. W. MERRITT ET AL  2,674,979
MILK RELEASE APPARATUS
Filed April 30, 1952  2 Sheets-Sheet 1
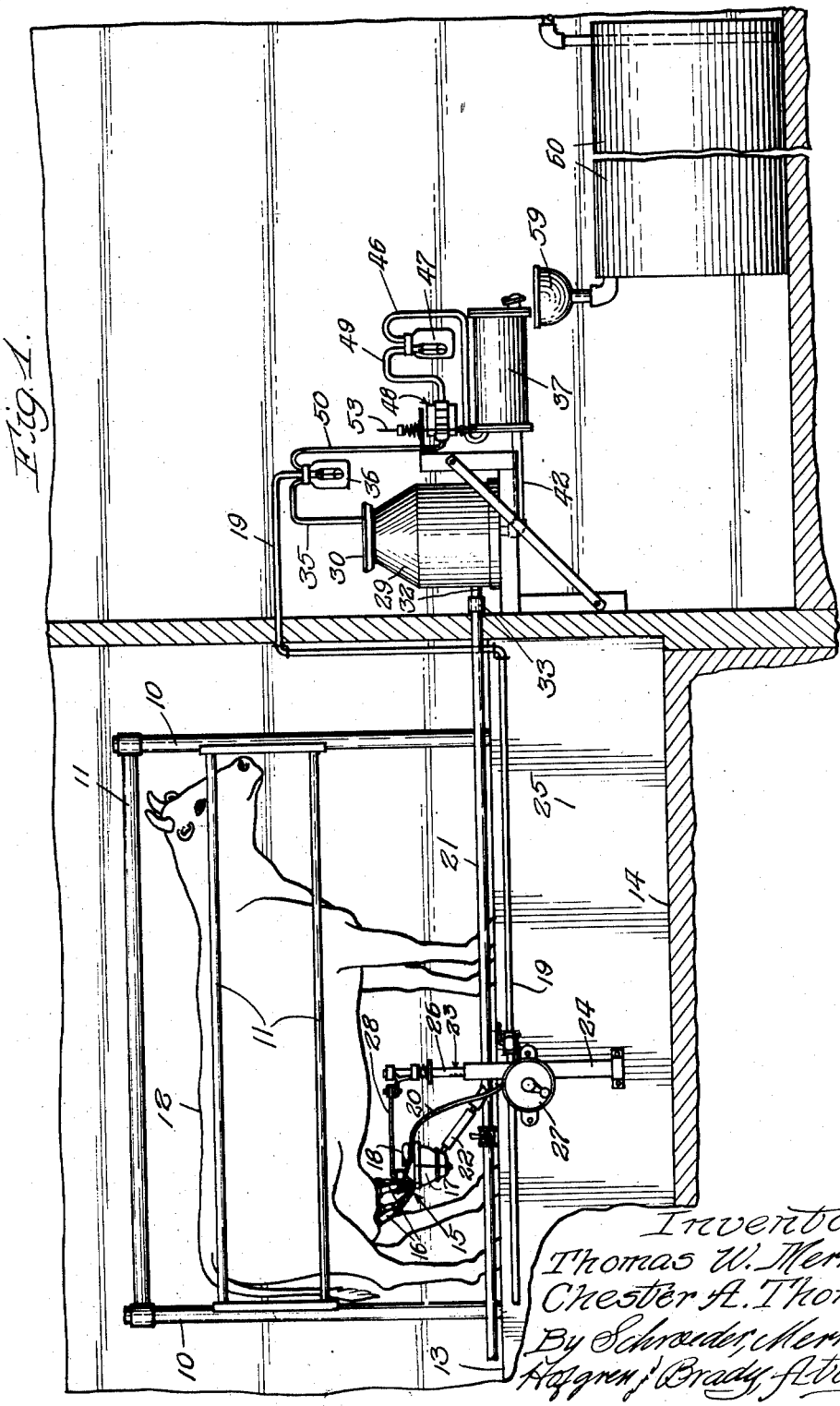

April 13, 1954    T. W. MERRITT ET AL    2,674,979
MILK RELEASE APPARATUS
Filed April 30, 1952      2 Sheets-Sheet 2
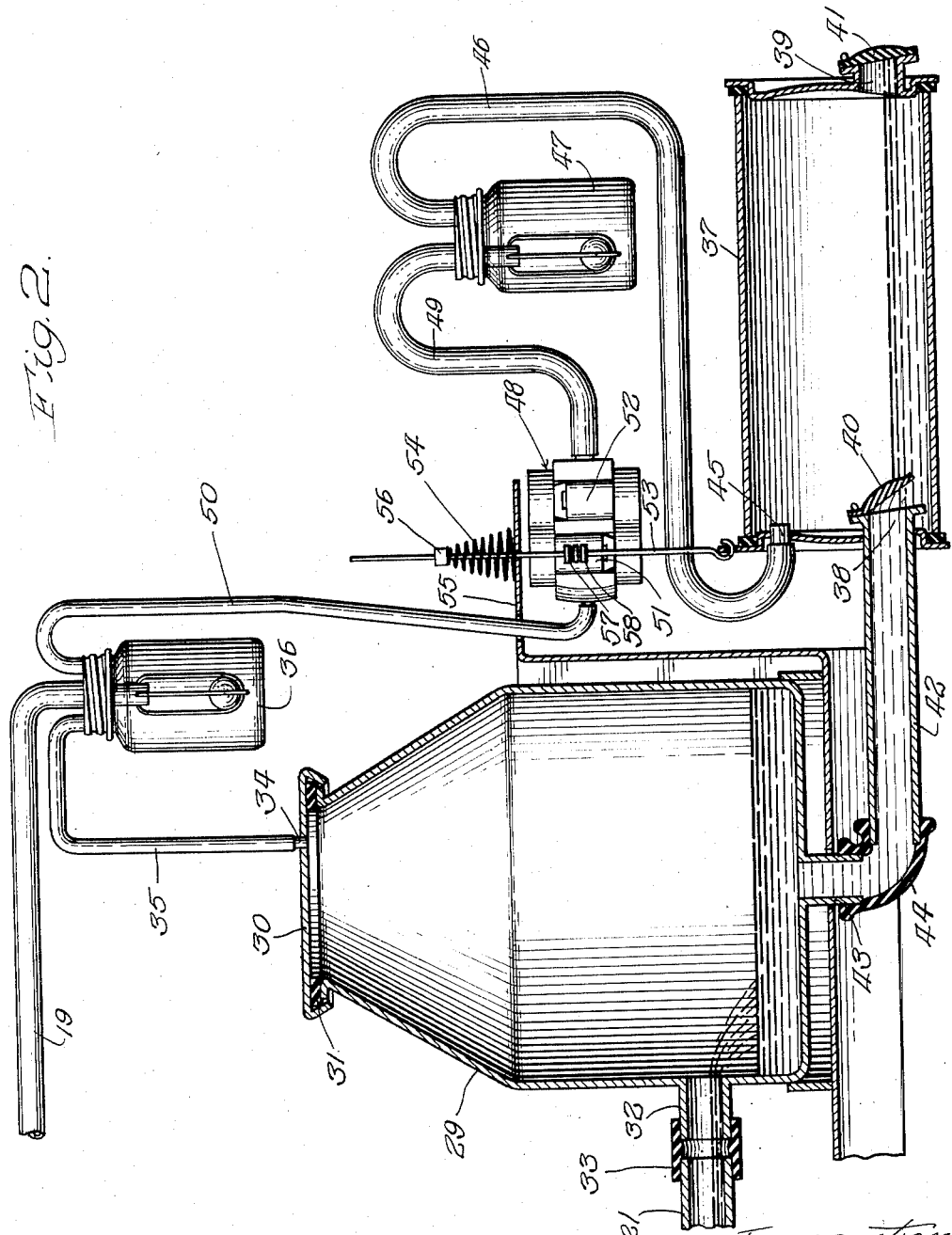

Patented Apr. 13, 1954

2,674,979

UNITED STATES PATENT OFFICE 2,674,979

MILK RELEASE APPARATUS

Thomas W. Merritt, St. Charles, and Chester A. Thomas, Lake Forest, Ill., assignors to Babson Bros. Co., a corporation of Illinois Application April 30, 1952, Serial No. 285,294

7 Claims. (Cl. 119—14.05)

This invention relates to a milking system and more particularly to an improved milk releaser apparatus for use with a milking system in which the milk, after being withdrawn from the cow, is transported through an evacuated pipeline to an evacuated container.

It has been common in the milking art to employ a continuously evacuated system in which the milk after being withdrawn from the cow by means of teat cups or other comparable apparatus passes into a continuously evacuated milk line or conduit through which it flows to a desired point of delivery, for example, a relatively large evacuated container or chamber. One of the major problems that has been encountered with such systems is to provide a means for removing or releasing the milk from the container without losing the vacuum in the entire system.

One object of this invention is to provide a milk releaser apparatus by means of which milk may be removed or released from an evacuated system without losing the vacuum in the system. Another object is to provide such an apparatus which is simply constructed and easy to disassemble and to clean. A further object is to provide such an apparatus that operates at a rate determined by the rate of flow of milk through the milk line. Another object is to provide apparatus having a minimum vertical drop from the milk line to the release point. Yet another object is to provide such a system in which a releaser chamber is connected to the evacuated system and is itself alternately evacuated and connected to atmosphere in response to the weight of milk in the releaser chamber in such a manner that the change between conditions is made relatively rapidly in response to a large change in the weight of milk in the releaser chamber.

Further objects and advantages of our invention will be apparent from the specification and from the drawings of which Figure 1 is a diagrammatic representation of a milking system embodying our invention; and Figure 2 is a diagrammatic view partly in section of our invention.

In Figure 1 our invention is shown as embodied in a milking parlor with the cow floor at a higher level than the operator's floor. Milking parlors of this general type are more fully described in Babson et al. Patent Reissue No. 22,368, and Babson et al. Patent No. 2,477,035. The simplified stall shown is only for sake of illustration and includes a pair of stanchions 10 and a plurality of transverse members 11.

In the particular embodiment of the invention illustrated, the cow 12 stands on a floor 13 a suitable distance, for example, two feet, above the operator's floor or alley 14. Milk withdrawal apparatus indicated generally at 15 is applied to the cow's teats for the purpose of extracting the milk from the cow. This apparatus may be of any type generally used with a so-called "carry away" system, but, as shown, we prefer to use apparatus described in co-pending Thomas application Serial No. 237,922, filed July 21, 1951, which includes teat cups 16, a breaker chamber 17 and pulsator 18. The pulsator 18 is connected to a vacuum line 19 by a conduit 20 and the breaker chamber is connected to the milk line 21 by a conduit 22.

The milk withdrawing apparatus is preferably supported by the adjustable supporting apparatus indicated generally as 23 and described more fully in Babson et al. Patent Reissue No. 22,368. It comprises a tube 24 mounted on the vertical wall 25 and carrying therein a rod member 26 which is both rotatably and axially movable with respect thereto. Axial movement is effected by an adjustment handle 27 and associated mechanism. The upper end of the rod 26 carries an arm 28 supporting the milk withdrawing assembly 15.

Milk which is withdrawn from the cow 12 passes through the breaker chamber 17, conduit 22 and into the milk line 21 through which it flows, generally along with the milk from other cows, into a continuously evacuated milk chamber 29, the chamber preferably being of appreciable size, for vacuum reservoir purposes and to receive all the milk moving through the line 21 when outlet therefor is closed off, the bottom preferably being below the level of the milk line. This chamber may be spaced from the milking parlor, for example, in a wash room or milk storage room as shown in Fig. 1.

The milk chamber 29 is preferably cylindrical in shape and is provided with a removable closure 30 and a gasket 31 to furnish a vacuum tight seal. A fitting 32 is provided on the side of the chamber to which the milk line 21 is secured by means of a rubber coupling 33. Another fitting 34 is provided on the closure member 30 to which a conduit 35 is connected, which is in turn connected to the vacuum line 19 through a milk trap 36 of conventional design. Thus a reduced pressure is continuously provided in the chamber 29, and thus in the pipe 21, for use in the milking operation and for causing the milk to flow through the milk line 21 into the chamber.

A milk releaser chamber 37 is provided which is preferably cylindrical in shape and may be constructed of a transparent material, as Lucite or Plexiglas, to facilitate checking the condition of the milk. The releaser chamber is provided with an inlet 38 and outlet 39 at either end thereof, which are adapted to be closed by the flap valves 40 and 41, respectively, of suitable material such as rubber. The inlet 38 communicates with the milk line 21 through a conduit 42 which is attached to a fitting 43 in the bottom of the milk chamber 29 by means of a flexible coupling 44, as of rubber.

A fitting 45 is provided in the releaser chamber 37 to which a conduit 46 is attached. This conduit is in turn attached to the vacuum line 19 by means of a fluid trap 47, a valve unit indicated generally as 48, and conduits 49 and 50.

The valve unit 48 is so constructed that it will alternately connect the releaser chamber 37 to the source of vacuum and to the atmosphere in response to a change of weight of milk in the releaser chamber. This valve is illustrated as and is preferably of the same type as a pulsator valve such as that disclosed in Fosler Patent 1,376,804, dated May 3, 1921, and in Babson Patent 2,464,917, dated March 22, 1949, and in which a control portion or member 51 controls the position of a switching portion or member 52 which in turn determines whether the conduit 49, and therefore the releaser chamber, is connected to a source of vacuum or to atmosphere.

The operation of the control valve 51 is effected by a mechanical, spring-biased, lost motion linkage comprising an elongated rod 53 connected to the releaser chamber and to the control valve, and a spring 54 mounted on a support 55 and in engagement with an adjustable collar 56 affixed to the rod 53. A pair of adjustable collars 57 and 58 are disposed in spaced relationship on the rod 53 so that they operatively engage the control valve 51 which is adapted to move the main valve 52 to the vacuum position when the releaser chamber 37 is empty and to the atmosphere position when the releaser chamber is filled, or substantially so.

A cycle of operation proceeds in the following manner. When the releaser chamber 37 is empty, it is in its highest position by virtue of the bias applied by the spring 54, at which time the collar 58 causes the control valve 51 to move to its upper position in turn causing the main valve 52 to connect the releaser chamber to the vacuum line 19. Milk flowing through the milk line 21 will continue on through the chamber 29 and past the open flap valve 40 into the releaser chamber 37. At this time, of course, flap valve 41 seals the outlet 39 and prevents loss of the vacuum in the system. As the releaser chamber 37 fills, it pivots downwardly about the flexible coupling 44 and after any lost motion has been taken up the upper collar 57 engages the control valve 51 moving it downward. As the control valve 51 reaches the lower limit of its travel, the connections to the main valve 52 are reversed and it connects the conduit 49 and the releaser chamber 37 to atmosphere. Flap valve 41 then opens and the milk accumulated within the releaser chamber flows out into a funnel or basin 59, as illustrated, and storage tank 60 or any other desired receiver or piece of milk-handling apparatus. At the same time, flap valve 40 closes the inlet 38 of the releaser chamber 37 thereby preventing the vacuum in the rest of the system from being interrupted. As the milk flows out of the releaser chamber 37, the chamber will rise in response to the bias applied by the spring 54. The collar 58 will then engage the control valve 51 and move it back to its upper position at which time the connections to the main valve are again reversed and the releaser chamber 37 is once again connected to the source of vacuum. The cyclic rate of the releaser apparatus depends on the rate of flow of milk through the milk line 21 and upon the amount of milk released during each cycle. The amount of milk released during each cycle may be determined by changing the spacing of the lost motion collars 57 and 58 on the rod 53.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. Milk release apparatus of the character described for use with a continuously evacuated milking system, comprising: a milk line; a continuously evacuated milk chamber communicating with said milk line; a movably mounted releaser chamber connected to said chamber and adapted to receive flow of milk therefrom; resilient means operably associated with said releaser chamber, biasing it upwardly; a source of vacuum; a conduit operably connected from said source of vacuum to said releaser chamber; a valve outside said releaser chamber and in said conduit adapted to connect said releaser chamber alternately to said source of vacuum and to atmosphere; and a mechanical lost-motion linkage connected to said releaser chamber and to said valve for controlling the position of said valve, said valve being adapted to change its position rapidly in response to a relatively large change in the weight of milk in said releaser chamber.

2. Milk release apparatus of the character described for use with a continuously evacuated milking system, comprising: a milk line; a continuously evacuated chamber connected thereto and adapted to receive flow of milk therefrom; a movably mounted releaser chamber connected to said chamber and adapted to effect the release of milk from the evacuated system, said releaser chamber being resiliently supported so that it moves in response to each change in the weight of milk therein; a source of vacuum; a conduit operably connected from said source of vacuum to said releaser chamber; valve means outside said releaser chamber and in said conduit said valve means having a control portion and a switching portion, said switching portion being adapted to connect said releaser chamber alternately to said source of vacuum and to atmosphere in response to the weight of milk in said chamber; and a mechanical lost-motion linkage connected to said releaser chamber and to the control portion of said valve means for controlling the position thereof, the switching portion of said valve means being adapted to change its position rapidly in response to a relatively large change in the weight of milk in said releaser chamber.

3. Milk release apparatus of the character described for use with a continuously evacuated milking system, comprising: a source of vacuum; a milk line; a continuously evacuated milk chamber adapted to receive flow of milk from said milk line; a first conduit operably connected between said source of vacuum and said chamber; a movably mounted releaser chamber having an inlet and an outlet and adapted to effect the release of milk from the evacuated system; a second conduit operably connected between said milk chamber and said inlet of said releaser chamber adapted for flow of milk therethrough to said releaser chamber; a third conduit operably connected from said source of vacuum to said releaser chamber; valve means outside said releaser chamber and in said third conduit said valve means having a control portion and a fluid operated switching portion, said switching portion being adapted to connect said releaser chamber alternately to said source of vacuum and to atmosphere; and a mechanical, lost motion linkage connected to said releaser chamber and to the control portion of said valve means for controlling the position of said control portion, said fluid operated switching portion being adapted to change its position rapidly in response to a relatively large change in the weight of milk in said releaser chamber.

4. Milk release apparatus of the character described for use with a continuously evacuated milking system, comprising: a source of vacuum; a milk line; a continuously evacuated milk chamber adapted to receive flow of milk from said milk line; a first conduit operably connected between said source of vacuum and said chamber; a movably mounted releaser chamber having an inlet and an outlet and adapted to effect the release of milk from the evacuated system; a second conduit, of resilient material, operably connected between said milk chamber and said inlet of said releaser chamber said second conduit being L-shaped and providing a substantially fixed fulcrum for movement of said releaser chamber; a third conduit operably connected from said source of vacuum to said releaser chamber; a valve outside said releaser chamber and in said third conduit adapted to connect said releaser chamber alternately to said source of vacuum and to atmosphere; and a mechanical, spring biased, adjustable, lost motion linkage connected to said releaser chamber and to said valve for controlling the position of said valve, said valve being adapted to change its position rapidly in response to a relatively large change in the weight of milk in said releaser chamber.

5. Milk release apparatus of the character described for use with a continuously evacuated milking system, comprising: a source of vacuum; a milk line; a continuously evacuated milk chamber adapted to receive flow of milk from said milk line; a first conduit operably connected between said source of vacuum and said chamber; a movably mounted releaser chamber having an inlet and an outlet and adapted to effect the release of milk from the evacuated system; a second conduit operably connected between said milk chamber and said inlet of said releaser chamber adapted for flow of milk to said releaser chamber; a connection between said source of vacuum and said releaser chamber; a valve, having a control member and a switching member, in said connection, said switching member being adapted to connect said releaser chamber alternately to said source of vacuum and to atmosphere; and a mechanical, spring biased, lost motion linkage connected to said releaser chamber and to said control member of said valve for controlling the position of said control member, thereby causing said switching member to change its position rapidly in response to a relatively large change in the weight of milk in said releaser chamber.

6. Milk release apparatus of the character described for use with a continuously evacuated milking system, comprising: a source of vacuum; a milk line; a continuously evacuated milk chamber adapted to receive flow of milk from said milk line; a movably mounted releaser chamber having an inlet and an outlet and adapted to effect the release of milk from the evacuated system; flap valves operatively associated with said inlet and said outlet; a second conduit operably connected between said milk chamber and said inlet of said releaser chamber adapted for flow of milk therethrough to said releaser chamber; a third conduit operably connected from said source of vacuum to said releaser chamber; valve means outside said releaser chamber and in said third conduit, said valve means having a control member and a vacuum operated switching member, said switching member being adapted to connect said releaser chamber alternately to said source of vacuum and to atmosphere; and a mechanical, adjustable, lost motion linkage connected to said releaser chamber and to the control member of said valve means for controlling the position thereof, the vacuum operated switching portion of said valve means being adapted to change its position rapidly in response to a relatively large change in the weight of milk in said releaser chamber, said lost motion linkage having an element which moves a predetermined distance before engaging the control member of said valve means.

7. Milk release apparatus of the character described for use with a continuously evacuated milking system, comprising: a source of vacuum; a milk line; a continuously evacuated milk chamber adapted to receive flow of milk from said milk line; a movably mounted releaser chamber having an inlet and an outlet and adapted to effect the release of milk from the evacuated system; flap valves operatively associated with said inlet and said outlet; a second conduit operably connected between said milk chamber and said inlet of said releaser chamber; a third conduit operably connected from said source of vacuum to said releaser chamber; valve means outside said releaser chamber and in said third conduit, said valve means having a control member and a power operated switching member, said switching member being adapted to connect said releaser chamber alternately to said source of vacuum and to atmosphere; a mechanical, lost motion linkage connected to said releaser chamber and to the control member of said valve means for controlling the position of said control member, the switching member of said valve means being adapted to change its position rapidly in response to a relatively large change in the weight of milk in said releaser chamber; and spring means operably associated with the releaser chamber, biasing said chamber upwardly.

References Cited in the file of this patent

UNITED STATES PATENTS

| Number | Name | Date |
| --- | --- | --- |
| 1,109,370 | Storrie | Sept. 1, 1914 |
| 1,474,669 | Hapgood | Nov. 20, 1923 |
| 1,546,437 | Daysh | July 21, 1925 |
| 2,176,527 | Gascoigne et al. | Oct. 17, 1939 |
| 2,564,620 | Berry | Aug. 14, 1951 |

FOREIGN PATENTS

| Number | Country | Date |
| --- | --- | --- |
| 496,497 | Great Britain | Nov. 30, 1938 |
| 509,051 | Great Britain | July 11, 1939 |